July 22, 1958　　　L. R. MARQUEZ　　　2,844,192
SEAT COVER
Filed June 25, 1956

INVENTOR:
LOUIS R. MARQUEZ
BY
ATT'YS

United States Patent Office 2,844,192
Patented July 22, 1958

2,844,192

SEAT COVER

Louis R. Marquez, Chicago, Ill., assignor to Atlas Specialty Manufacturing Company, Chicago, Ill., a corporation of Illinois Application June 25, 1956, Serial No. 593,456

2 Claims. (Cl. 155—182)

This invention relates to seat covers, especially of the kind that are placed over seats and/or seat cushions as a protection or as a concealment for the original covering, a practice now so conventional with motor vehicle seats.

The main objects of this invention are to provide an improved form of seat cover made from a single piece of material; to provide an improved seat cover so cut out from a single piece of material as to require stitching only along the juncture of the sides and ends which, in the finished cover, are disposed transverse to the top, and to provide an improved single-piece seat cover of this kind which by reason of its conservation of material and labor makes manufacture extremely economical and by reason of its form makes attachment to a seat a very simple operation for even the most unskilled of persons.

The essential concept of this invention involves a piece of material the corners of which are cut out to form three flaps which are folded in transversely of the body part of the piece of material with the adjacent overlapping flap edges bonded together.

A seat cover embodying the foregoing concept comprises a single piece of material cut to form a body part 6 and three integral flaps, adapted for folding transversely to the body part 6 and having their overlapping perimetrical portions secured together by reinforced stitching 11.

The piece of material, constituting such a seat cover, may be any type desired and suitable for the kind of seat to which the cover is to be applied. The material may be plain or patterned and/or transparent or opaque, depending upon individual tastes or other circumstances.

Figure 1:
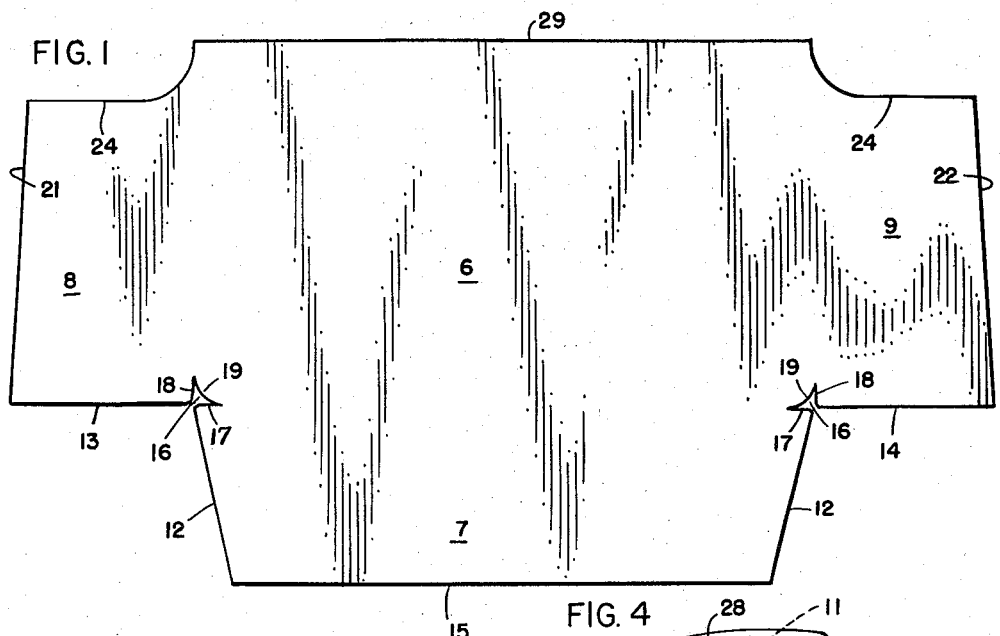
Figure 1 is a plan of a pattern-cut single piece of material from which is formed a seat cover constructed in accordance with this invention.

Fig. 1 shows what may be regarded either as a pattern for forming such a seat cover embodying this invention, or it may be regarded as the seat cover form ready to be converted into a seat cover. Assuming that Fig. 1 here represents a seat cover form, ready to be made into a cover, it has been cut out of a rectangular piece of material of the required dimensions.

To constitute the flaps 7, 8 and 9, two corners of the selected rectangular piece of material are cut out to form the end edges 12 of the front flap 7 and the forward edges 13 and 14 of the end flaps 8 and 9.

The end flap edges 13 and 14 are alined parallel with the longitudinal median of the body part 6. Such edges are located inwardly from the forward edge 15 of the front flap 7 a distance approximately equal to one-third the transverse medial width of the piece of material from which the cover form is cut. In this particular adaptation the length of the end flap edges 13 and 14, longitudinally of the piece of material, is substantially equal to the distance these lines 13 and 14 are inward from the forward edge 15 of the front flap 7. The end edges 12 of the front flap 7 converge slightly forwardly and thus are inclined a bit to the respectively-adjacent forward edges 13 and 14 of the end flaps 8 and 9, thereby forming slightly obtuse angles between the adjacent edges of the flaps 7, 8 and 9.

The body part 6, inwardly of the juncture of the edges 12 and 13 and 12 and 14 has sections cut out to form small openings 16 bounded by the edges 17, 18 and 19. The short edges 18 of the openings 16 are continuations of forward edges 13 and 14 of the end flaps 8 and 9. The opening edges 17 are practically continuations of the end edges 12 of the front flap 7. The opening edges 19 here are shown of arcuate form. However, they might be straight under some situations, thereby forming nearly perfect equilateral triangular openings 16.

The end edges 21 and 22 of the end flaps 8 and 9 here are shown converging rearwardly of the body part. There are many situations where this might be preferred to having these edges straight and at right angles to the forward edges 13 and 14 of the end flaps 8 and 9.

Figure 2:
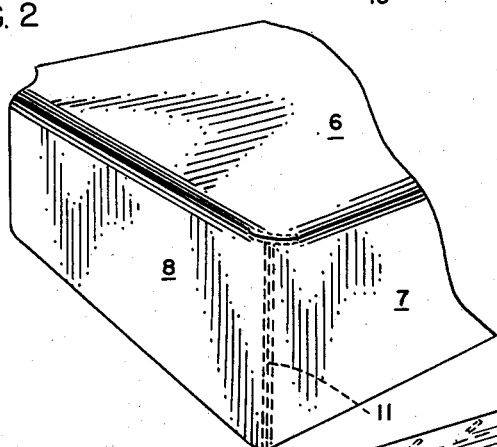
Fig. 2 is a perspective view of one end of the completed cover.

The completed seat cover form often may tuck in better around the rear of a seat 23 or be more conveniently fastened along the top rear edge of the seat 23 (see Fig. 3) if rear sections of the respective end flaps 8 and 9 are cut out along the lines 24, as shown in Figs. 1 and 2.

Such a seat cover form is convertible into a cover by having the three flaps 7, 8 and 9 folded into positions transverse to the body part 6 which becomes the top of the seat cover. Such folding will bring the perimetrical portions along the edges 12 and 13 and 12 and 14, respectively, into overlapping relationship to form seams. Over such seams may be folded a conventional strip of binding tape 26 and all secured together by stitching 11. (See Fig. 4.)

Figure 4:
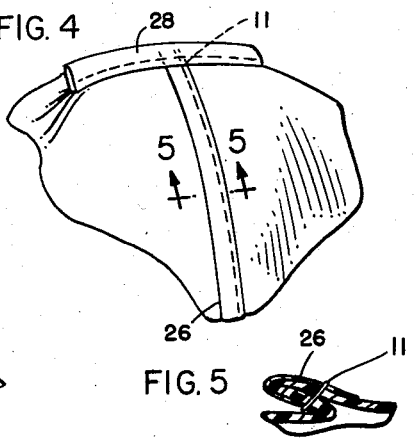
Fig. 4 is an enlarged, fragmentary, reverse or inside view of one of the corners, showing the taped seam formation.
Figure 5:
Fig. 5 is an enlarged, fragmentary, sectional detail taken on the plane of the line 5—5 of Fig. 4.

The folding of the flaps 7, 8 and 9 into such transverse relationship to the body part 6 and overlapping the perimetrical portions of the edges 12, 13 and 14 serves to effect an overlapping of the perimetrical portions of the body part 6 along the edges 17, 18 and 19 of the openings 16 to form short transversely-disposed seams at the inner ends of the seams formed by the overlapping portions of the flaps 7, 8 and 9. Such short transverse seams also have strips of binding tape folded over them and stitched together as shown in Figs. 3 and 4.

These short bits of stitching along the overlapping portions of the flaps 7, 8 and 9 and the overlapping portions of the body part 6 around the openings 16 is all the stitching that is required to form a seat cover embodying this invention, ready for placement on the seat 23.

Figure 3:
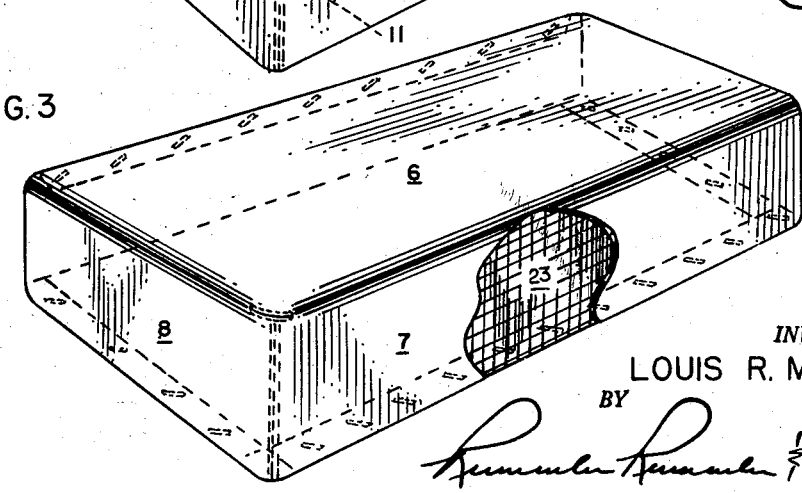
Fig. 3 is a perspective view of the completed seat cover in place on a motor-vehicle seat.

When so completed the seat cover very readily is slipped over a seat 23 as shown in Fig. 3. Thereupon the perimetrical portions along the forward edges 15 of the front flap 7, along the edges 21 and 22 of the end flaps 8 and 9, and along the rear edge 29 of the body part 6 may be folded under the base and over the back of the seat 23 and stapled, tacked, or otherwise secured to an appropriate frame part of the seat 23.

It is to be understood that numerous details may be altered or omitted without departing from the spirit of this invention as defined by the following claims:

I claim:

1. A seat-cushion cover adapted for permanent formation to fit over the top, the front-side and the ends of a seat cushion, the cover comprising a single piece of material cut to form a front flap and two end flaps integral with a body part with each flap of a width greater than the height of the seat cushion over which the cover is to fit, the forward edges of the end flaps being in a straight coplanar relationship with each other and the base fold line of the front flap and with the end edges of the end flaps straight and angled rearwardly inward toward the rear edge of the body part, the front flap being of a width approximately one-half of the transverse dimension of the body part with the ends of the front flap straight and angled forwardly inward toward the front edge of the front flap, the rear edges of the end flaps being disposed in straight coplanar relationship longitudinally of the body part inwardly of the rear edge of the body part, the body part having triangular sections cut out therefrom along the fold lines of the front flap and the respective end flaps inwardly from the juncture of the front edges of the end flaps and the adjacent edges of the front flap and the respective angles formed by the fold lines of the end flaps and front flap, the flaps being foldable transversely of the body part for binding along the adjacent straight edges of the flaps preparatory to having the cover overlaid on a seat cushion for subsequent fastening to a seat-cover frame along the free perimeters of the body part and the three flaps.

2. A seat-cushion cover adapted for permanent formation to fit over the top, the front side and the ends of a cushion, the cover comprising a single piece of material cut to form a front flap and two end flaps integral with a body part, the forward edges of the end flaps being in substantially straight coplanar relationship with each other and with the base fold line of the front flap, the lateral free edges of the end flaps and of the front flap being substantially straight, the body part having triangular sections cut out therefrom along the fold lines of the front flap and the respective end flaps inwardly from the juncture of the front edges of the end flaps and the adjacent edges of the front flap and the respective angles formed by the fold lines of the end flaps and the front flap, the flaps being foldable transversely of the body part for binding along the adjacent straight edges of the flaps and along the perimeters defining the triangular cut-outs, preparatory to having the cover overlaid on a seat cushion.

References Cited in the file of this patent

UNITED STATES PATENTS

| | | |
|---|---|---|
| 2,172,890 | Phillips | Sept. 12, 1939 |
| 2,228,948 | Field | Jan. 14, 1941 |
| 2,605,483 | Ridenhour | Aug. 5, 1952 |

FOREIGN PATENTS

| | | |
|---|---|---|
| 183,294 | Great Britain | July 27, 1922 |